(12) United States Patent
Lee et al.

(10) Patent No.: US 10,882,536 B2
(45) Date of Patent: Jan. 5, 2021

(54) AUTONOMOUS DRIVING CONTROL APPARATUS AND METHOD FOR NOTIFYING DEPARTURE OF FRONT VEHICLE

(71) Applicants: Hyundai Motor Company, Seoul (KR); Kia Motors Corporation, Seoul (KR)

(72) Inventors: Kyoung Jun Lee, Seoul (KR); Doo Jin Um, Seoul (KR); Dong Gu Lee, Seoul (KR); Dong Eon Oh, Seoul (KR); Hyun Jae Yoo, Seoul (KR); Beom Jun Kim, Seoul (KR); Dae Young Kim, Gwangmyeong-si (KR); Young Min Han, Gunpo-si (KR); Seung Geon Moon, Hwaseong-Si (KR); Sung Woo Choi, Gwangmyeong-si (KR); Chan Il Park, Yeongdong-gun (KR); Sung Yoon Yeo, Seoul (KR); Hoi Won Kim, Gwacheon-si (KR); Min Chul Kang, Uiwang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 350 days.

(21) Appl. No.: 15/986,500

(22) Filed: May 22, 2018

(65) Prior Publication Data
US 2019/0256106 A1    Aug. 22, 2019

(30) Foreign Application Priority Data
Feb. 19, 2018    (KR) .......................... 10-2018-0019484

(51) Int. Cl.
*B60W 50/06* (2006.01)
*B60W 50/14* (2020.01)
*G05D 1/00* (2006.01)

(52) U.S. Cl.
CPC ....... *B60W 50/14* (2013.01); *B60W 2050/143* (2013.01); *B60W 2540/00* (2013.01);
(Continued)

(58) Field of Classification Search
USPC ............... 701/23–28, 70, 116–119, 300, 301
See application file for complete search history.

(56) References Cited

U.S. PATENT DOCUMENTS 8,144,002 B2 *  3/2012  Kiuchi ................... G08G 1/166
                                                     340/435
9,809,167 B1 * 11/2017  Badger, II .............. B60Q 9/008
(Continued)

FOREIGN PATENT DOCUMENTS

JP      2015-068213 A     4/2015
KR      10-1344056 B1     1/2014
(Continued)

*Primary Examiner* — Jonathan L Sample
(74) *Attorney, Agent, or Firm* — Morgan, Lewis & Bockius LLP (57) ABSTRACT

An autonomous driving control apparatus that informs the driver of a departure of a front vehicle may include a front vehicle recognition device configured to recognize behavior information related to a front vehicle, a driver monitoring device configured to detect whether a driver is gazing at a front side thereof, and a processor configured to determine a time point of notification of a departure of the front vehicle in consideration of whether the driver is gazing at the front side thereof and the behavior of the front vehicle when recognizing the departure of the front vehicle through the front vehicle recognition device while a host vehicle and the front vehicle are stopped.

20 Claims, 5 Drawing Sheets

(52) U.S. Cl.
CPC . *B60W 2540/10* (2013.01); *B60W 2554/4041* (2020.02); *B60W 2554/801* (2020.02); *B60W 2554/804* (2020.02); *G05D 1/0088* (2013.01)

(56) References Cited

U.S. PATENT DOCUMENTS

| | | | | |
|---|---|---|---|---|
| 2010/0007479 | A1* | 1/2010 | Smith | B60W 50/14 |
| | | | | 340/436 |
| 2010/0023234 | A1* | 1/2010 | Kameyama | B60W 50/08 |
| | | | | 701/70 |
| 2010/0253539 | A1* | 10/2010 | Seder | G01S 13/87 |
| | | | | 340/903 |
| 2015/0191176 | A1* | 7/2015 | Kobana | B60K 28/06 |
| | | | | 701/70 |
| 2015/0266486 | A1* | 9/2015 | Silvlin | B60W 30/18163 |
| | | | | 701/70 |
| 2016/0001781 | A1* | 1/2016 | Fung | G16H 50/20 |
| | | | | 701/36 |
| 2016/0207455 | A1* | 7/2016 | Kim | B60W 40/08 |
| 2017/0166172 | A1* | 6/2017 | Kwon | B60T 7/22 |
| 2018/0075309 | A1* | 3/2018 | Sathyanarayana | H04N 5/247 |
| 2018/0129891 | A1* | 5/2018 | Ryu | B60W 40/04 |
| 2018/0173975 | A1* | 6/2018 | Adibi | A61B 5/4809 |
| 2018/0194280 | A1* | 7/2018 | Shibata | G01C 21/3658 |
| 2018/0197030 | A1* | 7/2018 | Yamataka | G06K 9/00845 |

FOREIGN PATENT DOCUMENTS

| | | | |
|---|---|---|---|
| KR | 10-2014-0033707 | A | 3/2014 |
| KR | 10-2015-0018134 | A | 2/2015 |
| KR | 10-1521118 | B1 | 6/2015 |

\* cited by examiner

AUTONOMOUS DRIVING CONTROL APPARATUS AND METHOD FOR NOTIFYING DEPARTURE OF FRONT VEHICLE

CROSS-REFERENCE TO RELATED APPLICATION

The present application claims priority to Korean Patent Application No. 10-2018-0019484, filed on Feb. 19, 2018, in the Korean Intellectual Property Office, the entire contents of which is incorporated herein for all purposes by this reference.

BACKGROUND OF THE INVENTION

Field of the Invention

The present invention relates to an autonomous driving control apparatus that informs the driver of a departure of a front vehicle when an autonomous driving vehicle is stopped, and a method for notifying a departure of a front vehicle.

Description of Related art

The autonomous driving system, such as a smart cruise control (SCC) system, measures a distance from a front vehicle and a relative velocity of the front vehicle by use of a radar sensor to maintain a safety distance between the vehicles. The autonomous driving system also stops if the front vehicle stops when a host vehicle that travels on the same lane performs a pursuit control is on the front vehicle. When a specific time period elapses after the host vehicle is stopped, a display that requires an intention of departure of the driver is transmitted and the host vehicle starts according to an intention of a departure of the driver (a button manipulation or an acceleration pedal manipulation after the front vehicle starts. When there is no intention of departure of the driver after the front vehicle starts, the driver is visually and/or audibly notified of a departure of the front vehicle.

However, when the front vehicle repeatedly stops and starts in a traffic jam situation, the conventional autonomous driving system may cause inconvenience of the driver due to the frequent notifications of the front vehicle.

Furthermore, even if the driver is concentrated on the front vehicle and the front traffic situation, a notification of the departure of the front vehicle is generated, which causes inconvenience to the driver.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an autonomous driving apparatus that determines whether a driver is gazing at the front side and provides a front vehicle departure notification, and a method for notifying a departure of a front vehicle.

Various aspects of the present invention are directed to providing an autonomous driving apparatus that determines a departure notification time point of a front vehicle in consideration of a departure time point, a start velocity, and a movement distance of the front vehicle when the host vehicle is stopped, and a method for notifying a departure of a front vehicle.

Various aspects of the present invention are directed to providing an autonomous driving apparatus that learns a start velocity and a movement distance of a front vehicle at a time point at which the driver reacts with a departure of the front vehicle when a departure notification function of the front vehicle is not used, providing a notification of the departure of the front vehicle at a time point desired by the driver based on the learning information, and a method for notifying a departure of a front vehicle.

The technical objects of the present invention are not limited to the above-mentioned one, and the other unmentioned technical objects will become apparent to those skilled in the art from the following description.

In accordance with an aspect of the present invention, there is provided an autonomous driving control apparatus including a front vehicle recognition device configured to recognize behavior information related to a front vehicle, a driver monitoring device configured to detect whether a driver is gazing at a front side, and a processor configured to determine a time point of notification of a departure of the front vehicle in consideration of whether the driver is gazing at the front side and the behavior of the front vehicle when recognizing the departure of the front vehicle through the front vehicle recognition device while a host vehicle and the front vehicle are stopped.

The front vehicle recognition device may measure a relative distance from the host vehicle and a relative velocity of the front vehicle with respect to a velocity of the host vehicle through a radar system and a front camera.

The driver monitoring device may detect a gaze point of the driver from an image acquired through a camera and may determine whether the driver is gazing at the front side according to whether the detected gaze point is located within a reference front side gaze area.

The processor may not perform a notification of a departure of the front vehicle when the driver is gazing at the front side thereof.

The processor may determine whether the driver has to be notified of a departure of the front vehicle according to whether the start velocity of the front vehicle satisfies a departure notification condition of the front vehicle when the driver is not gazing at the front side thereof.

The processor may determine whether the driver has to be notified of a departure of the front vehicle according to whether the movement distance of the front vehicle satisfies a departure notification condition of the front vehicle when the driver is not gazing at the front side thereof.

The departure notification condition of the front vehicle may be determined according to a reference front vehicle start velocity, a reference front vehicle movement distance, and a set output notification sensitivity of the front vehicle.

The autonomous driving control apparatus may further include a vehicle information detector configured to detect whether a brake pedal of the host vehicle is being operated, whether an acceleration pedal of the host vehicle is being operated, and a transmission gear of the host vehicle is being manipulated.

The processor may detect a reaction of the driver to the departure of the front vehicle after the stop of the front vehicle through the vehicle information detector when a departure notification function of the front vehicle is not used.

The processor may learn a front vehicle departure notification sensitivity according to a reaction of the driver by measuring a start velocity and a movement distance of the front vehicle in a departure situation of the host vehicle and using the start velocity and the movement distance of the front vehicle, which were measured.

The front vehicle departure notification sensitivity may be set according to a user input.

In accordance with another aspect of the present invention, there is provided a method for notifying a departure of a front vehicle by an autonomous driving control apparatus, the method including recognizing, by a processor, a departure of the front vehicle while a host vehicle and a front vehicle are stopped, determining, by the processor, whether the driver is gazing at a front side of a driver when the processor recognizes the departure of the front vehicle, and determining, by the processor, whether a notification of a departure of the front vehicle is output in consideration of behavior information related to the front vehicle when the driver is not gazing at the front side thereof.

In the determining whether the driver is gazing at the front side, the processor may not notify the driver of the departure of the front vehicle when the driver is gazing at the front side thereof.

The processor may learn a reaction of the driver of the host vehicle according to a departure after a stop of the front vehicle when the processor does not notify the driver of the departure of the front vehicle.

The determining whether the notification of the departure of the front vehicle is being output may include detecting a start velocity of the front vehicle and determining whether the notification of the departure of the front vehicle is being output according to whether the detected start velocity satisfies a departure notification condition of the front vehicle.

The departure notification condition of the front vehicle may be determined according to a reference front vehicle start velocity and a set output notification sensitivity of the front vehicle.

The determining whether the notification of the departure of the front vehicle is being output may include detecting a movement of the front vehicle and determining whether the notification of the departure of the front vehicle is being output according to whether the detected movement distance satisfies a departure notification condition of the front vehicle.

The departure notification condition of the front vehicle may be determined according to a reference front vehicle movement distance and a set output notification sensitivity of the front vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the contrary, the invention(s) is/are intended to cover not only the exemplary embodiments of the present invention, but also various alternatives, modifications, equivalents and other embodiments, which may be included within the spirit and scope of the invention as defined by the appended claims.

Furthermore, terms, such as first, second, A, B, (a), (b) or the like may be used herein when describing components of the present invention. The terms are provided only to distinguish the elements from other elements, and the essences, sequences, orders, and numbers of the elements are not limited by the terms. Furthermore, unless defined otherwise, all terms used herein, including technical or scientific terms, have the same meanings as those generally understood by those skilled in the art to which the present invention pertains. The terms defined in the generally used dictionaries should be construed as having the meanings that coincide with the meanings of the contexts of the related technologies, and should not be construed as ideal or excessively formal meanings unless clearly defined in the specification of the present invention.

The present invention relates to a technology of informing the driver of a departure of a front vehicle when an autonomous driving vehicle is stopped to minimize inconvenience of the driver due to frequency departure notifications by providing departure notifications of the front vehicle only in necessary situations. In the specification, the front vehicle refers to a vehicle which is in front of a host vehicle on the same lane.

Figure 1:
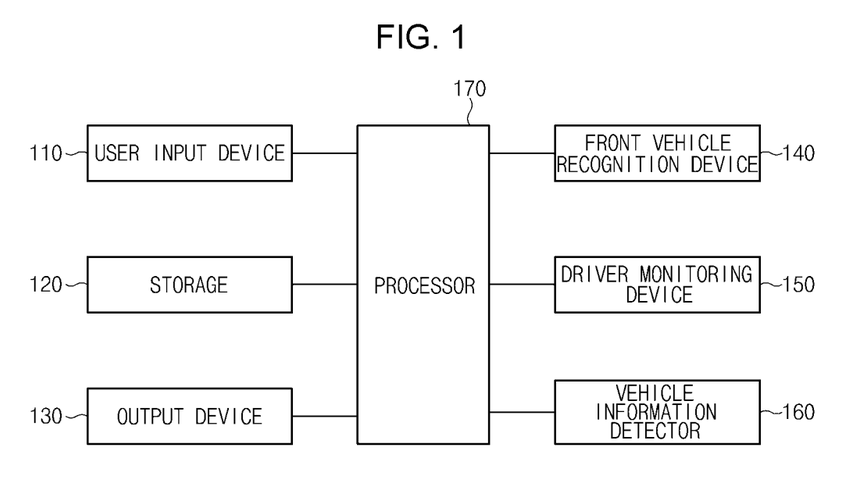
FIG. 1 is a block diagram of an apparatus configured for controlling autonomous driving according to an exemplary embodiment of the present invention.
Figure 2:
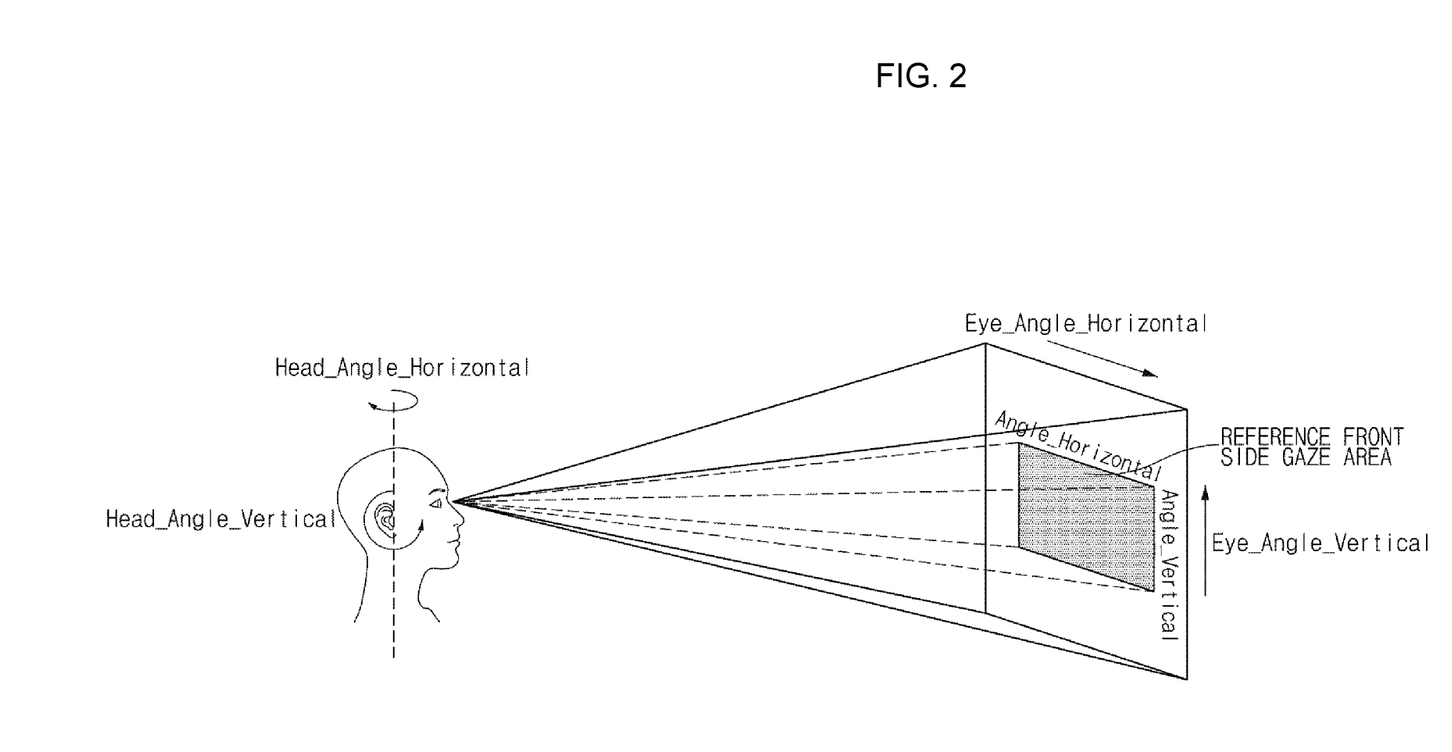
FIG. 2 is a diagram for explaining an operation of determining whether a front side is gazed at by use of a face recognition technology related to the present invention.

FIG. 1 illustrates a block diagram of an apparatus configured for controlling autonomous driving according to an exemplary embodiment of the present invention. FIG. 2 illustrates a diagram for explaining an operation of determining whether a front side is gazed at by use of a face recognition technology related to the present invention. FIG.

Figure 3:
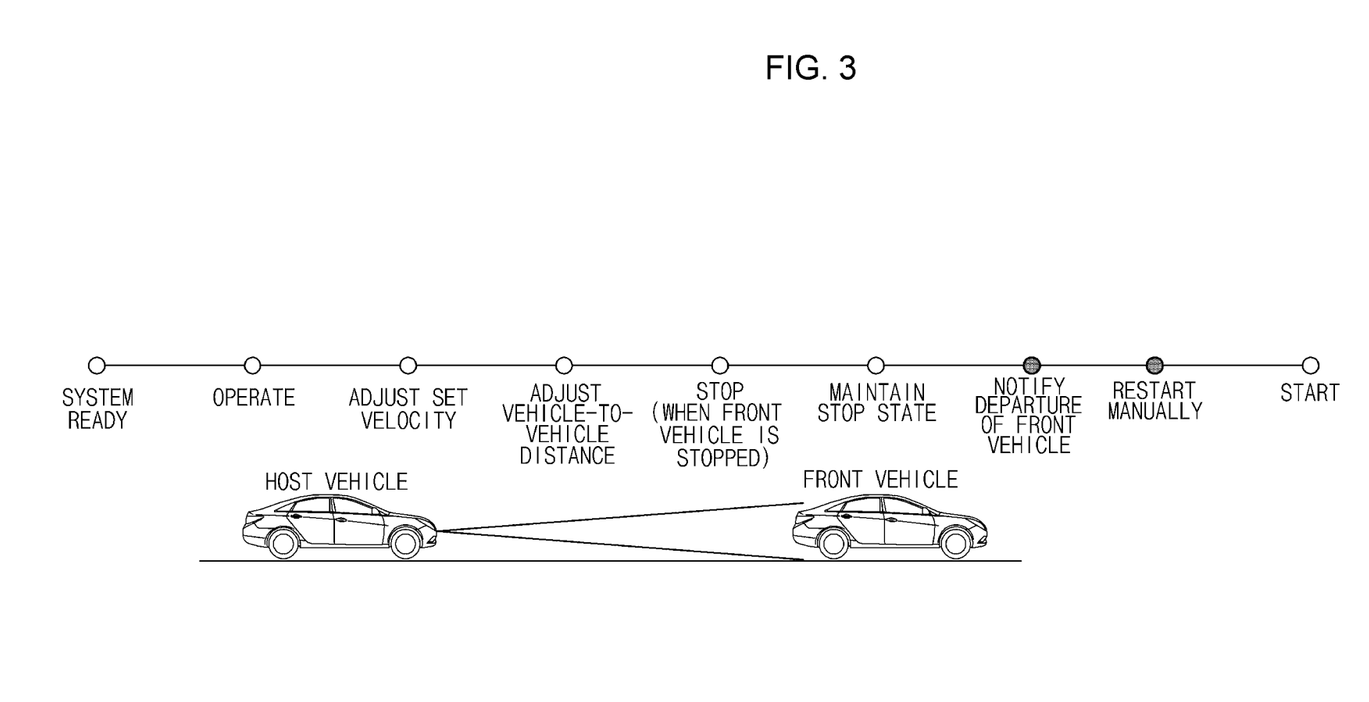
FIG. 3 is a diagram for explaining a time point of a notification of a departure of a front vehicle related to the present invention.

3 illustrates a diagram for explaining a time point of a notification of a departure of a front vehicle related to the present invention.

As illustrated in FIG. 1, an autonomous driving control apparatus according to an exemplary embodiment of the present invention may include a user input device 110, a storage 120, an output device 130, a front vehicle recognition device 140, a driver monitoring device 150, a vehicle information detector 160, a processor 170. The processor 170 is connected to the user input device 110, the storage 120, the output device 130, the front vehicle recognition device 140, the driver monitoring device 150, and the vehicle information detector 160 through an in-vehicle networking. The in-vehicle networking may include controller area network (CAN) communication, media oriented systems transport (MOST) communication, local interconnect network (LIN) communication, X-by-Wire (Flexray) communication, Ethernet, and serial communication.

The user input device 110 is a device configured for receiving data (a control signal, a command, information, and the like) from the user. The user input device 110 generates an autonomous system on/off command according to a manipulation of the user. The user input device 110 may include a touchpad, a keyboard, a switch, a button, a voice input device (e.g., a microphone), a joystick, and a jog wheel.

The storage 120 stores software programmed to allow the processor 170 to perform a specific operation. Furthermore, the storage 120 stores map data and various pieces of setting information. The storage 120 may temporarily store data (information) generated according to an operation of the processor 170.

The storage 120 may be implemented by one or more of storage media (recording media) such as a flash memory, a hard disk, a secure digital (SD) card, a random access memory (RAM), a read only memory (ROM), an electrically erasable and programmable ROM (EEPROM), an erasable and programmable ROM (EPROM), a register, a detachable disk, and web storage The output device 130 outputs departure of the front vehicle in a form of a visual and/or audible information. The output device 130 may output control situations, such as setting of autonomous driving, release of autonomous driving, a setting velocity, a vehicle-to-vehicle distance, a departure notification of the front vehicle, and an alarm. The output device 130 may include a display module, an audio output module, and a haptic module.

The display module may include at least one of output devices, such as a liquid crystal display (LCD), a thin film transistor-liquid crystal display (TFT-LCD), an organic light-emitting diode (OLED) display, a flexible display, a 3D display, a transparent display, a head-up display (HUD), a touchscreen, and a cluster. The audio output module is a device that outputs audio data, and may include a receiver, a speaker, and a buzzer. The haptic module generates a signal which the user may recognize in a haptic way. For example, the haptic module may generate vibration by controlling a vibrator. As such, the haptic module may control the intensity and a pattern of vibration.

The front vehicle recognition device 140 recognizes the front vehicle located in front of the host vehicle by use of distance sensors, such as a radio detecting and ranging (radar) system, a light detection and ranging (LiDAR) system, an ultrasonic sensor, a front camera (including an image sensor and a light), and a global positioning system (GPS) module. Here, the front camera may be mounted on the host vehicle to face the front side of the host vehicle, and two or more front cameras may be disposed.

The front vehicle recognition device 140 determines a distance between the host vehicle and the front vehicle (a relative distance of the front vehicle from the host vehicle) and a relative velocity of the front vehicle (with respect to the velocity of the host vehicle) by use of data measured by use of the distance sensor, the image sensor, and the Global Positioning System (GPS) module. The front vehicle recognition device 140 transmits behavior information related to the front vehicle, including the distance between the host vehicle and the front vehicle and the relative velocity of the front vehicle, to the processor 170.

The driver monitoring device 150 is configured to monitor whether the driver is gazing at the front side thereof. The driver monitoring device 150 acquires an image through a camera disposed to face the driver in the vehicle. The driver monitoring device 150 extracts the facial portion (face) of the driver from the image acquired through the camera. As such, the driver monitoring device 150 may recognize the facial portion of the driver by use of a known face recognition technology.

The driver monitoring device 150 may detect a horizontal rotation angle (Head_Angle_Horizontal) of the face, a vertical rotation angle (Head_Angle_Vertical) of the face, a horizontal gaze angle (Eye_Angle_Horizontal) of an eye, and a vertical gaze angle (Eye_Angle_Vertical) of the eye from the image acquired through the camera by use of an image processing and image analysis technology (see FIG. 2).

The driver monitoring device 150 determines that the driver is gazing at the front side when both the following two conditions are satisfied.

[Front side gaze determining conditions]

$$\text{Minimum front gaze horizontal angle (Angle\_Horizontal\_Min)} < \text{Head\_Angle\_Horizontal} + \text{Eye\_Angle\_Horizontal} < \text{Maximum front gaze horizontal angle (Angle\_Horizontal\_Max)} \qquad 1)$$

$$\text{Minimum front gaze vertical angle (Angle\_Vertical\_Min)} < \text{Head\_Angle\_Vertical} + \text{Eye\_Angle\_Vertical} < \text{Maximum front gaze vertical angle (Angle\_Vertical\_Max)} \qquad 2)$$

That is, the driver monitoring device 150 detects a gaze point of the driver, and determines that the driver gases the front side when the detected gaze point is located in a reference front side gaze area of FIG. 2. As such, the driver monitoring device 150 may detect (recognize) the gaze point of the driver by use of a known gaze point detection (recognition) technology.

Meanwhile, the driver monitoring device 150 determines that the driver is not gazing at the front side when the gaze point of the driver deviates from the reference front side gaze area. Furthermore, the driver monitoring device 150 transmits the determination result to the processor 170.

The vehicle information detector 160 detects vehicle information through an electronic control unit (ECU) and various sensors (e.g., a velocity sensor, an acceleration sensor, a steering sensor, and a GPS receiver) mounted on the vehicle. The vehicle information may include whether a brake is operated, whether an acceleration pedal is operated, a location of a transmission lever, a location of the vehicle, a velocity of the vehicle, a steering angle, a steering torque, and a velocity of wheels.

The front vehicle recognition device 140, the driver monitoring device 150, and the vehicle information detector 160 may include a processor and a memory.

The processor 170 controls an overall operation of the autonomous driving control apparatus. The processor 170 may include at least one of an application specific integrated circuit (ASIC), a digital signal processor (DSP), programmable logic devices (PLDs), field programmable gate arrays (FPGAs), a central processing unit (CPU), microcontrollers, and microprocessors.

The processor 170 sets an autonomous driving system when an autonomous driving system receives a command from the user input device 110. That is, the processor 170 operates the autonomous driving system. The processor 170 sets a point of departure, a destination, a target velocity, and/or a target vehicle-to-vehicle distance according to a user input which is input through the user input device 110 when the autonomous driving system is operated. The processor 170 controls the host vehicle to safely travel to a set destination by utilizing various sensors and an electronic control unit (ECU) mounted on the vehicle. That is, the processor 170 recognizes a driving environment of the vehicle through various sensors and controls the behavior of the host vehicle by controlling an acceleration control device, a braking control device, a transmission control device, and a steering control device.

The processor 170 provides a user setting menu (USM). The user (driver) may set an environment parameter related a front vehicle departure notification function in the USM by manipulating the user input device 110. The environment parameter may include whether the driver has to be notified of a departure of the front vehicle and a front vehicle departure notification sensitivity ($W_S$).

The front vehicle departure notification sensitivity may be set to any one of a rapid mode, a usual mode, a slow mode, and a learning mode as in Table 1. Here, the rapid mode is a mode in which a movement distance and a start velocity of a front vehicle, and a time parameter after the start of the front vehicle are minimized, the usual mode is a mode in which a movement distance and a start velocity of a front vehicle, and a time parameter after the start of the front vehicle are generalized, the slow mode is a mode in which a movement distance and a start velocity of a front vehicle, and a time parameter after the start of the front vehicle are maximized, and the learning mode is a mode in which a movement distance and a start velocity of a front vehicle, and a time parameter after the start of the front vehicle are set through learning of a departure condition situation of the driver.

TABLE 1

| Sensitivity setting mode | Speed condition | | Distance condition | | Note |
|---|---|---|---|---|---|
| | Start velocity ($V_{start}$ = 10) | Sensitivity ($W_{S1}$) | Movement distance ($V_{start}$ = 2) | Sensitivity ($W_{S2}$) | |
| Rapid | 5 kph | 0.5 | 1 m | 0.5 | Mode for rapidly transmitting notification of departure |
| Usual | 10 kph | 1 | 2 m | 1 | Mode for usually transmitting notification of departure |
| Slow | 15 kph | 1.5 | 3 m | 1.5 | Mode for slowly transmitting notification of departure |
| Learning | $V_{start} \times V_{st,Learning}$ | $W_{St,Learning}$ | $D_{start} \times W_{S2,Learning}$ | $W_{S2,Learning}$ | Mode for learning reaction of driver to apply notification of departure |

Here, $V_{start}$ is a reference start velocity of a front vehicle for determining whether the driver has to be notified of a departure of the front vehicle, $v_{start}$ measured is a start velocity (current velocity) of the front vehicle at a time point at which the driver starts the host vehicle, $D_{start}$ is a reference movement distance of the front vehicle for determining whether the driver has to be notified of a departure of the front vehicle, $D_{start,measured}$ is a movement distance of the front vehicle at a time point at which the driver starts the host vehicle (a distance by which the front vehicle moves after being stopped), $W_{S1}$ is a sensitivity for the start velocity of the front vehicle, $W_{S2}$ is a sensitivity for the movement distance of the front vehicle, and $W_{S1}$, Learning and $W_{S2}$, Learning are parameters that are changed according to the driver and represents sensitivities that have been learned.

The processor 170 stops the host vehicle by controlling the braking control device when detecting a stop of the front vehicle through the front vehicle recognition device 140. The processor 170 determines that the driving state of the host vehicle is a stop state when the stop state of the host vehicle is maintained for a predetermined time period (e.g., 3 seconds) or more. Furthermore, the processor 170 operates a front vehicle departure notification function when the driving state of the host vehicle is determined to be a stop state.

Meanwhile, the processor 170 starts the host vehicle by controlling the acceleration control device when detecting a departure (a movement) of the front vehicle within a predetermined time period after the host vehicle is stopped. That is, the processor 170 does not operate the front vehicle departure notification function.

It has been referred to as an example in the present embodiment that the front vehicle departure notification function is not operated when the start of the front vehicle is detected within a predetermined time period after the host vehicle is stopped, the present invention is not limited thereto and it may be realized that the front vehicle departure notification function is operated even when a departure of the front vehicle is detected within a predetermined time period (stop state) after the host vehicle is stopped.

The processor 170 identifies whether the driver is gazing at the front side through the driver monitoring device 150 after operating the front vehicle departure notification function. The processor 170 does not notify the driver of a departure of the front vehicle when the driver is gazing at the front side thereof.

Meanwhile, the processor 170 detects a start velocity and a movement distance of the front vehicle through the front vehicle recognition device 140 when the driver is not gazing at the front side thereof. The processor 170 identifies whether the start velocity and the movement distance of the front vehicle, which were detected, satisfies one or more of the following two conditions.

[Front Vehicle Departure Notification Condition]

Start velocity of the front vehicle≥Reference start velocity ($V_{start}$ kph)×Set sensitivity ($W_S$)    1)

Movement distance of the front vehicle≥Reference movement distance ($D_{start}$ m)×Set sensitivity ($W_S$)

The processor 170 outputs a notification of a start of the front vehicle through the output device 130 when the detected start velocity of the front vehicle is 'Reference start velocity ($V_{start}$ kph)×Set sensitivity ($W_S$)' or more.

The processor 170 outputs a notification of a start of the front vehicle through the output device 130 when the detected movement distance of the front vehicle is 'Reference start movement distance ($D_{start}$ m)×Set sensitivity ($W_S$)' or more.

Meanwhile, the processor 170 outputs a notification that notifies the user of the departure of the front vehicle when the detected start velocity of the front vehicle is 'Reference start velocity ($V_{start}$ kph)×Set sensitivity ($W_S$)' or more and when the detected movement distance of the front vehicle is 'Reference start movement distance $D_{start}$ m)×Set sensitivity ($W_S$)' or more.

The processor 170 waits until a manipulation (reaction) of the driver for the front vehicle departure notification is made after the front vehicle departure notification is output. Thereafter, the processor 170 controls the behavior of the host vehicle according to an input when a manipulation of the driver is input.

Furthermore, the processor 170 detects a stop and a departure of the front vehicle through the front vehicle recognition device 140 when the front vehicle departure notification function is not used, and detects a reaction (manipulation) of the driver to a departure after a stop of the front vehicle through the vehicle information detector 160. Here, the reaction of the driver may include a release of an operation of the brake pedal, an operation of the acceleration pedal, and a change of D gear stage.

The processor 170 determines (measures) a start velocity $V_{start, measured}$ and a movement distance $D_{start, measured}$ of the front vehicle through the front vehicle recognition device 140 at a corresponding time point when the front vehicle starts after a stop and one or more of a release of an operation of the brake pedal, an operation of the acceleration pedal, and a change of D gear stage is detected. That is, the processor 170 measures a start velocity and a movement distance of the front vehicle at a time point of detection when an intention of start of the host vehicle by the driver is detected when the front vehicle starts after the host vehicle and the front vehicle are stopped.

The processor 170 determines sensitivities $W_{S1, Cal}$ and $W_{S2, Cal}$ for the start velocity (current velocity) and the movement distance (a distance by which the vehicle moves after the front vehicle is stop) of the front vehicle, which were measured. The sensitivities are determined by use of Equations 1 and 2.

$$W_{S1,Cal} = V_{start,measured}/V_{start} \quad \text{[Equation 1]}$$

$$W_{S2,Cal} = D_{start,measured}/D_{start} \quad \text{[Equation 2]}$$

The processor 170 determines the final sensitivities $W_{S1, Learning}$ and $W_{S2, Learning}$ by determining accumulated averages of the measured values (the start velocity and the movement distance of the front vehicle) measured in a host vehicle departure situation. The final sensitivities $W_{S1, Learning}$ and $W_{S2, Learning}$ may be represented as in Equations 3 and 4.

$$W_{S1,Learning} = \Sigma W_{S1,Cal}/N \quad \text{[Equation 3]}$$

$$W_{S2,Learning} = \Sigma W_{S2,Cal}/N \quad \text{[Equation 4]}$$

Here, N denotes the number of learning.

As described above, the processor 170 learns a reaction of the driver to a departure after a stop of the front vehicle. That is, the processor 170 learns a departure condition (a start velocity and a movement distance) of the front vehicle when identifying an intention of a departure of the host vehicle by the driver when the front vehicle starts after a stop. Thereafter, the processor 170 determines a front vehicle departure notification time point by reflecting the learned sensitivity when the front vehicle departure notification sensitivity is set to a learning mode.

The above-mentioned autonomous driving control apparatus according to an exemplary embodiment of the present invention variably changes (adjusts) a front vehicle departure notification time point according to the front vehicle departure notification sensitivity. That is, the autonomous driving control apparatus variably notifies the driver of a front vehicle departure notification according to the set front vehicle departure notification sensitivity.

Figure 4:
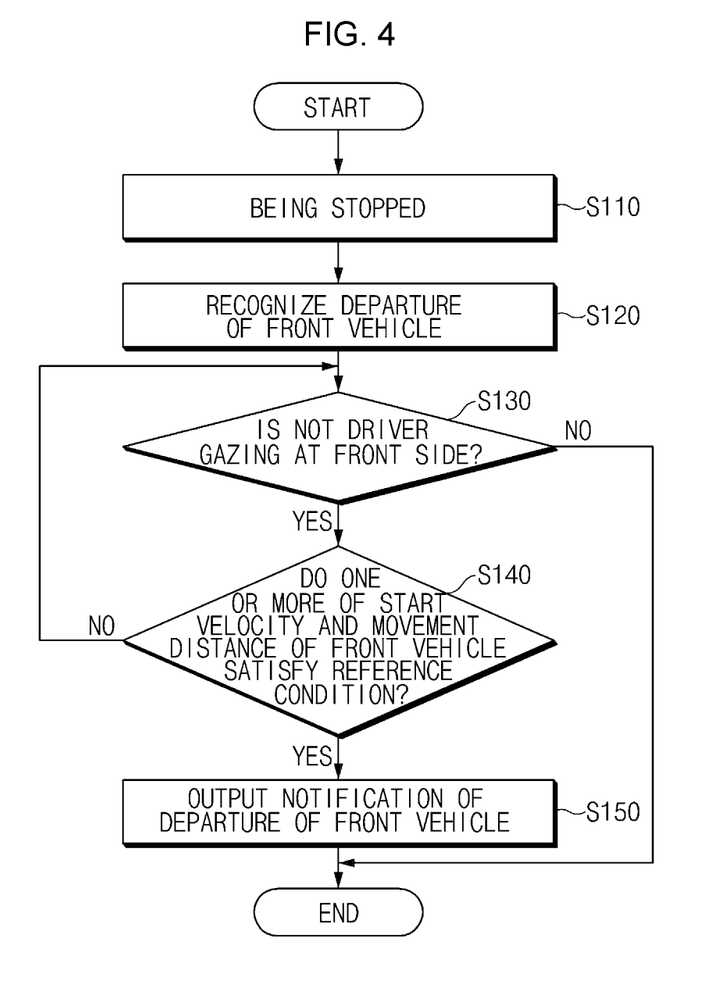
FIG. 4 is a flowchart illustrating a front vehicle departure notifying method of an autonomous driving control apparatus according to an exemplary embodiment of the present invention.

FIG. 4 is a flowchart illustrating a front vehicle departure notifying method of an autonomous driving control apparatus according to an exemplary embodiment of the present invention.

Referring to FIG. 4, the processor 170 stops the host vehicle and maintains the stop state through the braking control device when detecting a stop of the front vehicle through the front vehicle recognition device 140 (S110). The processor 170 executes (operates) a front vehicle departure notification function when recognizing a stop of the front vehicle. As such, the processor 170 operates the front vehicle departure notification function immediately after recognizing the stop of the front vehicle, or operates the front vehicle departure notification function when a predetermined period time elapses after the host vehicle is stopped as the front vehicle is stopped.

The processor 170 recognizes a departure of the front vehicle through the front vehicle recognition device 140 while the front vehicle is stopped (S120). The processor 170 may recognize a departure of the front vehicle through a change of a distance between the host vehicle and the front vehicle while the host vehicle is stopped. The processor 170 identifies whether the driver is gazing at the front side through the driver monitoring device 150 after operating the front vehicle departure notification function (S130). The driver monitoring device 150 detects a gaze point of the driver from an image acquired through a camera by use of a known image processing and image analysis technique, and identifies whether the detected gaze point is located within a reference front side gaze area. The driver monitoring device 150 determines that the state of the driver is a front side gaze state when the detected gaze point is located within the reference front side gaze area, and determines that the state of the driver is a non-front side gaze state when the detected gaze point deviates from the reference front side gaze area.

The processor 170 identifies whether one or more of the start velocity and the movement distance of the front vehicle satisfy a reference condition when the driver is not gazing at the front side (S140). The processor 170 measures the start velocity and the movement distance of the front vehicle through the front vehicle recognition device 140 when the state of the driver is a non-front side gaze state. The processor 170 identifies whether the measured start velocity of the front vehicle satisfies the front vehicle departure notification condition. Furthermore, the processor 170 identifies whether the measured movement distance of the front vehicle satisfies the front vehicle departure notification condition. As such, the front vehicle departure notification condition is changed according to the set sensitivity.

The processor 170 outputs a notification that notifies the driver of a departure of the front vehicle through the output device 130 when one or more of the start velocity and the movement distance of the front vehicle satisfy a reference condition (S150). That is, the processor 170 outputs a front vehicle departure notification when the measured start velocity of the front vehicle satisfies the front vehicle departure notification condition, the measured movement distance of the front vehicle satisfies the front vehicle departure notification condition, or the start velocity and the movement distance of the front vehicle, which were measured, satisfy the front vehicle departure notification condition. The front vehicle departure notification is output in one or more forms of visual information, audible information, or haptic information.

Figure 5:
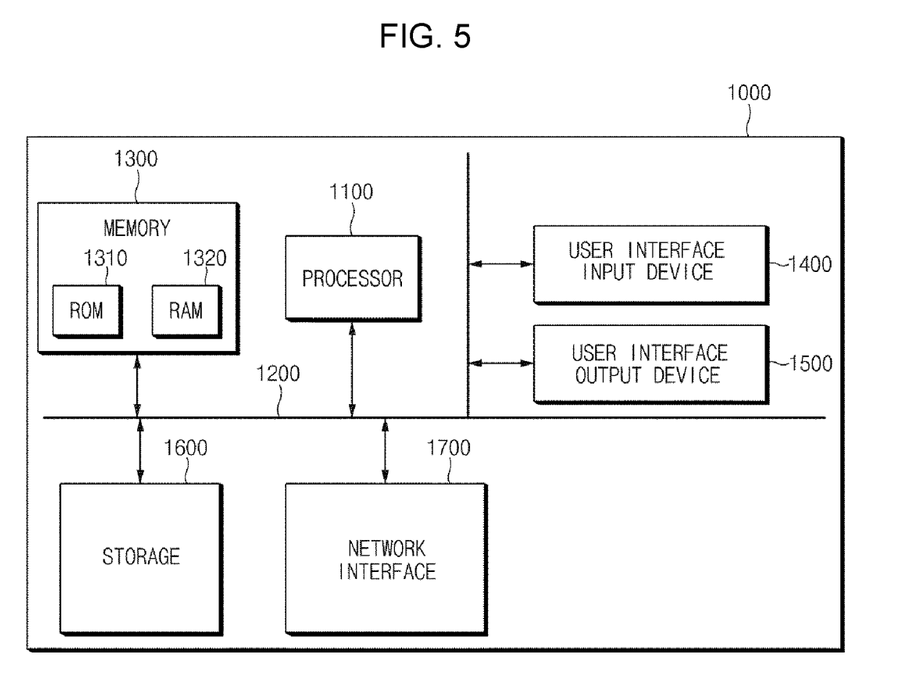
FIG. 5 is a block diagram illustrating a computing system for executing a method for notifying a departure of a front vehicle according to an exemplary embodiment of the present invention.

Meanwhile, in operation S130, the processor 170 does not notify the driver of a departure of the front vehicle when the driver is gazing at the front side thereof. FIG. 5 is a block diagram illustrating a computing system for executing a method for notifying a departure of a front vehicle according to an exemplary embodiment of the present invention.

Referring to FIG. 5, the computing system 1000 may include at least one processor 1100 connected through a bus 1200, a memory 1300, a user interface input device 1400, a user interface output device 1500, a storage 1600, and a network interface 1700.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the steps of the method or algorithm described in relation to the exemplary embodiments of the present invention may be implemented directly by hardware executed by the processor 1100, a software module, or a combination thereof. The software module may reside in a storage medium (that is, the memory 1300 and/or the storage 1600), such as a RAM memory, a flash memory, a ROM memory, an EPROM memory, an EEPROM memory, a register, a hard disk, a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The present invention may prevent an unnecessary notification by determining whether the driver is gazing at the front side and notifying the driver of a departure of the front vehicle.

Furthermore, because a time point of a notification of a departure of a front vehicle is determined in consideration of a start velocity and a movement distance of the front vehicle, the present invention may provide the notification of the departure of the front vehicle only when requires the notification and may minimize inconvenience of the driver due to frequent notifications of the departure of the front vehicle.

Furthermore, because a start velocity and a movement distance of a front vehicle at a time point at which the driver reacts with a departure of the front vehicle are learned when a departure notification function of the front vehicle is not used, the present invention may provide a notification of the departure of the front vehicle at a time point desired by the driver based on the learning information.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An autonomous driving control apparatus comprising:
    a front vehicle recognition device configured to recognize behavior information related to a front vehicle;
    a driver monitoring device configured to detect whether a driver in a host vehicle is gazing at a front side of the driver; and
    a processor configured to determine a time point of notification of a departure of the front vehicle in consideration of whether the driver is gazing at the front side, the behavior information of the front vehicle, and a front vehicle departure notification sensitivity when recognizing the departure of the front vehicle through the front vehicle recognition device after the host vehicle and the front vehicle are stopped, wherein the processor measures a start velocity and a movement distance of the front vehicle using the front vehicle recognition device in a departure situation of the host vehicle, and determines the front vehicle departure notification sensitivity based on a reference start velocity and the start velocity of the front vehicle or a reference movement distance and the movement distance of the front vehicle.

2. The autonomous driving control apparatus of claim 1, wherein the front vehicle recognition device determines the behavior information including a relative distance of the front vehicle from the host vehicle and a relative velocity of the front vehicle with respect to a velocity of the host vehicle.

3. The autonomous driving control apparatus of claim 2, wherein the front vehicle recognition device determines the relative distance and the relative velocity through a radar system and a front camera.

4. The autonomous driving control apparatus of claim 1, wherein the driver monitoring device detects a gaze point of the driver from an image acquired through a camera and determines whether the driver is gazing at the front side according to whether the detected gaze point is located within a reference front side gaze area.

5. The autonomous driving control apparatus of claim 1, wherein the processor does not perform a notification of the departure of the front vehicle when the driver is gazing at the front side.

6. The autonomous driving control apparatus of claim 1, wherein the processor determines whether the driver has to be notified of the departure of the front vehicle according to whether the start velocity of the front vehicle satisfies a departure notification condition of the front vehicle when the driver is not gazing at the front side.

7. The autonomous driving control apparatus of claim 1, wherein the processor determines whether the driver has to be notified of the departure of the front vehicle according to whether the movement distance of the front vehicle satisfies a departure notification condition of the front vehicle when the driver is not gazing at the front side.

8. The autonomous driving control apparatus of claim 6, wherein the departure notification condition of the front vehicle is determined according to a reference front vehicle start velocity, a reference front vehicle movement distance, and a set output notification sensitivity of the front vehicle.

9. The autonomous driving control apparatus of claim 1, further including:
a vehicle information detector configured to detect whether a brake pedal of the host vehicle is being operated, whether an acceleration pedal of the host vehicle is being operated, and a transmission gear of the host vehicle is being manipulated.

10. The autonomous driving control apparatus of claim 9, wherein the processor detects a reaction of the driver to the departure of the front vehicle after a stop of the front vehicle through the vehicle information detector when a departure notification function of the front vehicle is not used.

11. The autonomous driving control apparatus of claim 10, wherein the processor learns the front vehicle departure notification sensitivity according to a reaction of the driver by measuring the start velocity and the movement distance of the front vehicle in a departure situation of the host vehicle and using the start velocity and the movement distance of the front vehicle, which were determined.

12. The autonomous driving control apparatus of claim 11, wherein the front vehicle departure notification sensitivity is set according to a user input.

13. A method for notifying a departure of a front vehicle by an autonomous driving control apparatus, the method including:
recognizing, by a processor, the departure of the front vehicle after a host vehicle and the front vehicle are stopped;
determining, by the processor, whether the driver is gazing at a front side of the driver when the processor recognizes the departure of the front vehicle; and
determining, by the processor, whether a notification of the departure of the front vehicle is output in consideration of behavior information related to the front vehicle and a front vehicle departure notification sensitivity when the driver is not gazing at the front side,
wherein the processor measures a start velocity and a movement distance of the front vehicle using the front vehicle recognition device in a departure situation of the host vehicle, and determines the front vehicle departure notification sensitivity based on a reference start velocity and the start velocity of the front vehicle or a reference movement distance and the movement distance of the front vehicle.

14. The method of claim 13, wherein in the determining of whether the driver is gazing at the front side, the processor does not notify the driver of the departure of the front vehicle when the driver is gazing at the front side thereof.

15. The method of claim 14, wherein the processor learns a reaction of the driver of the host vehicle according to the departure after a stop of the front vehicle when the processor does not notify the driver of the departure of the front vehicle.

16. The method of claim 13, wherein the determining of whether the notification of the departure of the front vehicle is being output includes:
detecting the start velocity of the front vehicle and determining whether the notification of the departure of the front vehicle is being output according to whether the detected start velocity satisfies a departure notification condition of the front vehicle.

17. The method of claim 16, wherein the departure notification condition of the front vehicle is determined according to a reference front vehicle start velocity and a set output notification sensitivity of the front vehicle.

18. The method of claim 13, wherein the determining of whether the notification of the departure of the front vehicle is being output includes:
detecting a movement of the front vehicle and determining whether the notification of the departure of the front vehicle is being output according to whether the detected movement distance satisfies a departure notification condition of the front vehicle.

19. The method of claim 18, wherein the departure notification condition of the front vehicle is determined according to a reference front vehicle movement distance and a set output notification sensitivity of the front vehicle.

20. The method of claim 18, wherein the behavior information includes a relative distance of the front vehicle from the host vehicle and a relative velocity of the front vehicle with respect to a velocity of the host vehicle.

* * * * *